United States Patent [19]
Fusselman

[11] Patent Number: 5,707,482
[45] Date of Patent: Jan. 13, 1998

[54] REMOVABLE HIGHLIGHTING TAPE

[76] Inventor: Stephen M. Fusselman, 6514 Bay Drive, Eden Prairie, Minn. 55346

[21] Appl. No.: 649,060

[22] Filed: May 16, 1996

[51] Int. Cl.$^6$ ............................................. C09J 7/02
[52] U.S. Cl. ..................... 156/577; 156/576; 428/343; 428/355 RA
[58] Field of Search ........................... 428/343, 355, 428/355 RA; 156/577, 579

[56] References Cited

U.S. PATENT DOCUMENTS

| | | | |
|---|---|---|---|
| 4,913,946 | 4/1990 | Sala | 428/343 |
| 4,985,302 | 1/1991 | Sala | 428/343 |
| 5,076,883 | 12/1991 | Bosley | 156/522 |
| 5,518,576 | 5/1996 | Mendelovich | 156/523 |

*Primary Examiner*—Jenna Davis
*Attorney, Agent, or Firm*—Palmatier, Sjoquist, Helget & Voigt, P.A.

[57] ABSTRACT

The highlighting tape generally comprises a highlighting film and an adhesive. The highlighting film is a thin, pliable translucent film of a color that will make the underlying text stand out. The film is capable of being cut or torn. The adhesive is a non-permanent, translucent adhesive that is easily held in place when pressed to a surface. The highlighting tape may be dispensed from a tape dispenser that supports a tape roll configuration. The tape dispenser is trapezoidally shaped and designed to fit the average user's hand. The tape dispenser generally comprises a hollow casing. Hinged to the hollow casing is a tape roll holding mechanism which employs a spinning, toothed hub which easily holds in place a roll of highlighting tape wound about a toothed core. Also hinged to the hollow casing is a release latch which when open allows the tape holding mechanism to swing out and be reloaded with a new roll of highlighting tape. When closed, the release latch holds the tape roll holding mechanism in place for easy tape dispensing. To employ the highlighting tape one need only dispense the tape from the tape dispenser using its guide lip to guide placement of the tape atop the original document. When highlighting is completed, one need only press down and away on the guide lip to tear the tape free from the dispenser. The highlighting tape can easily be peeled up and relocated to highlight new text or thrown away.

4 Claims, 2 Drawing Sheets

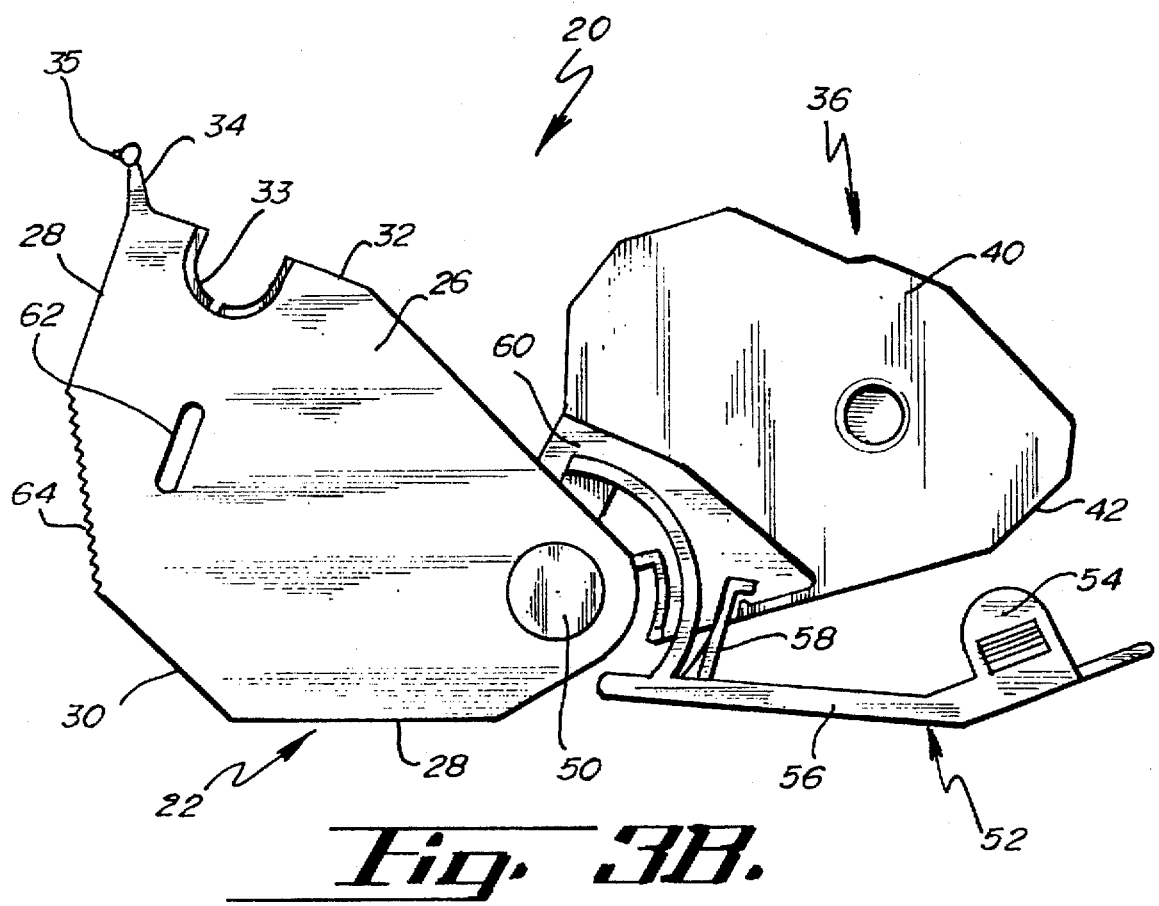
Fig. 3B.
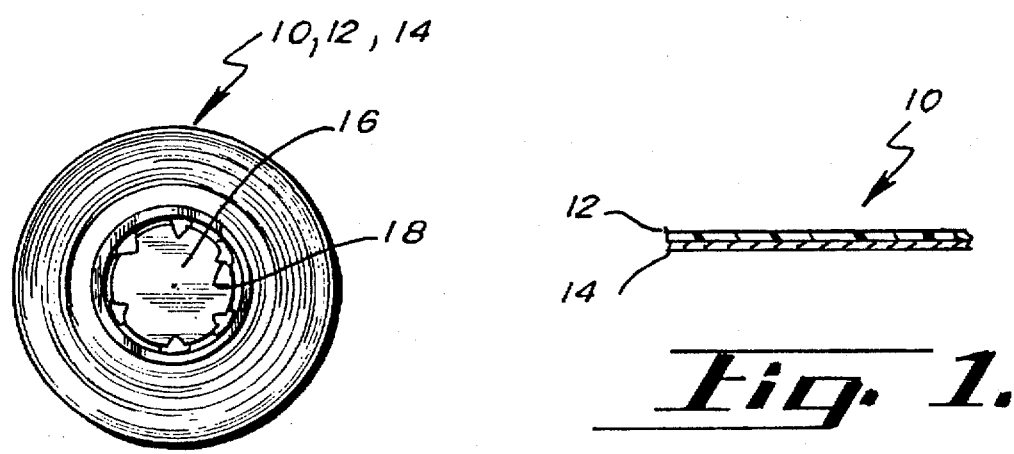
Fig. 2.
Fig. 1.

REMOVABLE HIGHLIGHTING TAPE

BACKGROUND

This invention relates to the highlighting of written material and more particularly to a highlighting tape that is both removable and reusable.

Typically, highlighting of written material is performed through use of an highlighting ink pen. The ink, which allows the underlying text to be read, is of course also permanent thus leaving behind a marred original. This is not a serious concern where the original can be easily photocopied and duplicated. However, when dealing with an original that is difficult to duplicate, too expensive to duplicate or should not be duplicated due to copyright laws permanent highlighting becomes a genuine concern.

For instance, consider the case of books containing parchment paper pages, such as the Bible. These books are often very expensive, yet one may want to highlight a favorite passage. Using an highlighting ink pen would mar the original page of the passage and would most likely soak through to also mar the back side of the page and its text as well as subsequent pages. The problem of ink soaking through a page to its backside is also a concern in the highlighting of newspaper and magazine articles.

Moreover, every student knows that it is almost a requirement that important points in a text book be highlighted. Using a permanent highlighting ink pen mars that text book which will most likely result in a lower book store buy back rate than if the text remained in an unblemished state. Additionally, elementary and high school students are often told to refrain from permanently marking in their text books so that next year's class who will be reusing the books will have a clean and unmarred text.

Additionally, should one accidentally highlight a one-of-a-kind original document that original is left with the permanent ink mark. Even if one were able to photocopy the now marked original that highlighter ink will often reappear as a dark box on the copy itself leaving one with a damaged original and an unusable copy.

For the foregoing reasons there is a need for a removable highlighting tape,

SUMMARY

The highlighting tape generally comprises a highlighting film and an adhesive. The highlighting film is a thin, pliable translucent film of a color that will make the underlying text stand out. The film is capable of being cut or torn. The adhesive is a non-permanent, translucent adhesive that is easily held in place when pressed to a surface. The highlighting tape may be dispensed from a tape dispenser that supports a tape roll configuration. The tape dispenser is trapezoidally shaped and designed to fit the average user's hand. The tape dispenser generally comprises a hollow casing. Hinged to the hollow casing is a tape roll holding mechanism which employs a spinning, toothed hub which easily holds in place a roll of highlighting tape wound about a toothed core. Also hinged to the hollow casing is a release latch which when open allows the tape holding mechanism to swing out and be reloaded with a new roll of highlighting tape. When closed, the release latch holds the tape roll holding mechanism in place for easy tape dispensing. To employ the highlighting tape one need only dispense the tape from the tape dispenser using its guide lip to guide placement of the tape atop the original document. When highlighting is completed, one need only press down and away on the guide lip to tear the tape free from the dispenser. The highlighting tape can easily be peeled up and relocated to highlight new text or thrown away.

An object and advantage of the invention is that the highlighting tape can be used without harming an original document because it is removable and leaves no adhesive residue behind. Thus, when used on text books, the books can be returned to the book store or to next year's class in an unblemished and higher value state.

A further object and advantage of the invention is that the highlighting tape can be used without the worry that it will seep through and damage the backside of a page thereby allowing those who own treasured books, such as those with parchment paper pages, to highlight favorite passages without worry.

A further object and advantage of the invention is that the highlighting tape may be cut to a width during manufacture that is narrow enough so that a single individual line of text may be highlighted as opposed to highlighting two or three lines of text at once. Thus, a key word, phrase or sentence alone may be highlighted.

DRAWINGS

These and other features, aspects, and advantages of the present invention will become better understood with regard to the following description, appended claims, and accompanying drawings where:

FIG. 1 depicts the layers of the highlighting tape;

FIG. 2 depicts the highlighting tape in a roll configuration wound about a toothed core;

FIG. 3B is a back elevational view of the highlighting tape dispenser; and

DETAILED DESCRIPTION

Figure 4:
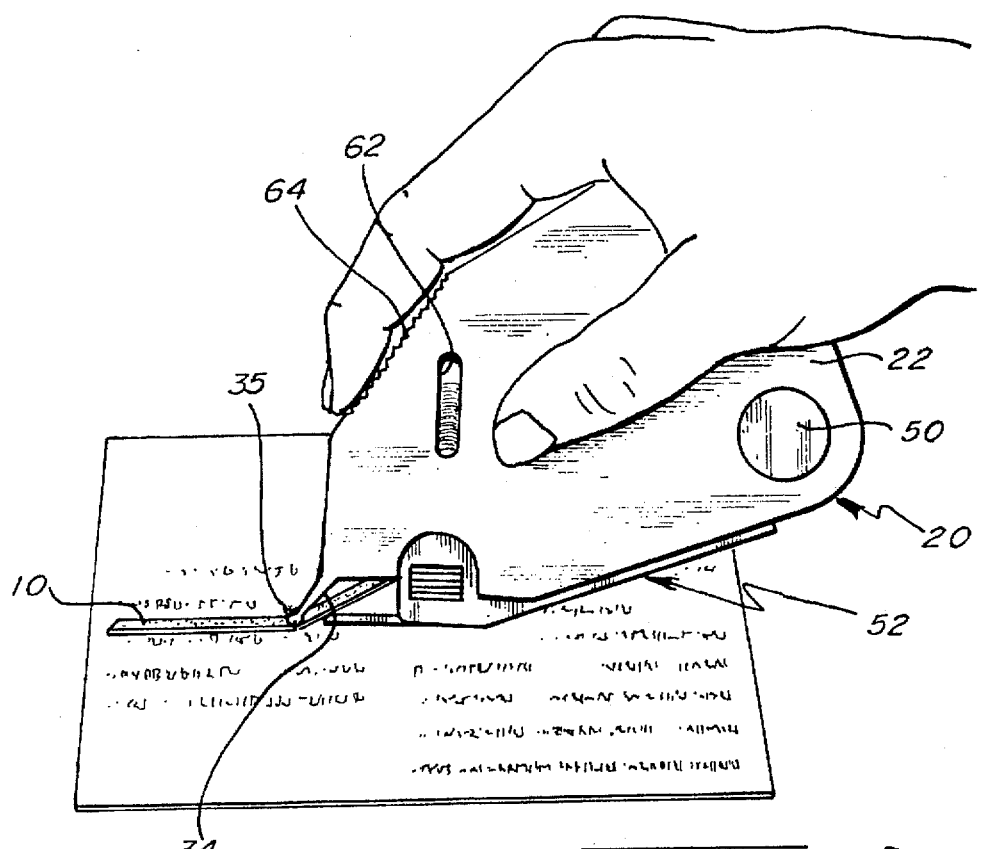
FIG. 4 depicts the highlighting tape as used to highlight a single line of text on an original document.

The highlighting tape 10, shown in FIGS. 1, 2 and 4, comprises a thin film 12 and an adhesive 14. The highlighting tape dispenser, shown in FIGS. 3A, 3B and 4, generally comprises a trapezoidal-shaped hollow casing 22 with an extending guide lip 34, a hinged tape roll holder 36 and a release latch 52.

To create the highlighting tape 10, a roll of thin, colorfast, translucent, clear or opaque film 12 is fed through a standard coater. During the coater run, one side of the film 12 is plied with a very thin uniform layer of translucent, pressure sensitive adhesive 14, see FIG. 1. Thus, creating a highlighting tape with characteristics similar to a POST-IT® note in that the highlighting tape can be applied to a printed document, removed and reapplied to a printed document without leaving behind an adhesive residue and without damaging the document print or paper. The film is a standard cellulose acetate. The adhesive is similar to the removable adhesive found on the back of 3M brand POST-IT® notes or Barbara Thomas Enterprises, Inc. brand REDI-TAG's®. Once the highlighting tape 10 has been created it is wound about a plastic hollow core 16 into a roll configuration, FIG. 2. The inner ring of the core 16 contains a plurality of teeth 18 which are used to hold the roll configuration highlighting tape 10 in position in the tape dispenser 20. The highlighting tape 10 and plastic core 16 are then simultaneously cut to appropriate tape dispenser 20 width using a standard cutting means known to those versed in the art. The highlighting tape 10 and core 16 may be cut to any width however the preferred width is narrow enough so that a single individual line of text may be highlighted, as shown in FIG. 4, as opposed to highlighting two or three lines of text at once.

Figure 3A:
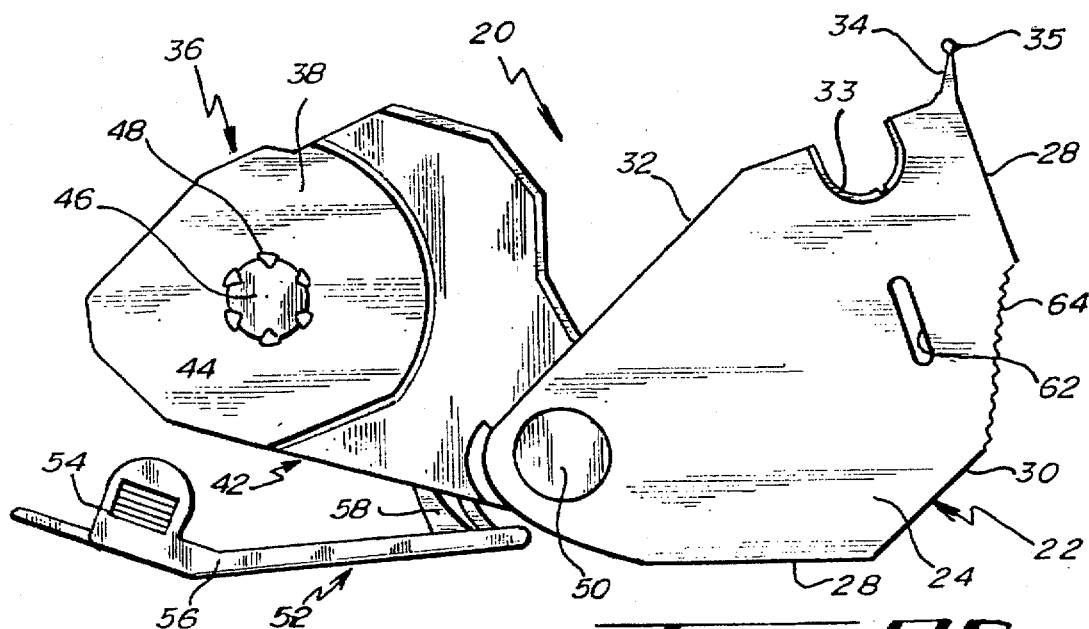
FIG. 3A is a from elevational view of the highlighting tape dispenser.

The attributes of the hand-held highlighting tape dispenser 20 may now be appreciated, see generally FIGS. 3A and 3B. The design of the tape dispenser 20 begins with the trapezoidal-shaped hollow casing 22. The casing 22 is generally made of molded plastic and has a solid trapezoidally-shaped front 24 portion as well as a solid trapezoidally-shaped back 26 portion. The front 24 and back 26 portions are joined together by two solid side 28 portions and a top 30 portion. The bottom 32 of the casing is left open. The width of the sides 28 and top 30 are set wide enough to easily allow the casing 22 to accept the tape roll holder 36 and a roll configuration of highlighting tape 10 yet narrow enough to allow the tape dispenser to be easily held in the user's hand. The front 24 and back 26 portion of the hollow casing 22 each maintains a notch 33 to accept the release latch locking clasps 54, discussed below. Additionally, extending from one of the side 28 portions is a guide lip 34 that helps to guide placement of the highlighting tape as it is dispensed from the tape dispenser 20 to the printed document it is serving to highlight. At the end of the guide lip 34 is a sharpened cutting edge 35 which serves to cut the highlighting tape.

Hingedly attached between the front 24 and back 26 portions of the casing 22 is the trapezoidally-shaped tape roll holder 36, see generally FIGS. 3A and 3B. The tape roll holder 36 is a singular, solid, plastic molded piece having a front side 38, back side 40 and bottom portion 42. On the front side 38 of the tape roll holder 36 is a cavity 44 of a wide enough diameter and depth to hold a roll configuration of highlighting tape 10. Centrally located within the cavity 44 is a spinning hub 46. The outer rim of the hub 46 contains a plurality of protruding teeth 48. The hub teeth 48 mesh with the core teeth 18 serving to hold a roll configuration of highlighting tape 10 securely to the tape roll holder 36 and also serving to help the highlighting tape 10 dispense smoothly. The back side 40 and bottom portion 42 of the tape roll holder 36 contain a recess 60.

The tape roll holder release latch 52 is also hingedly attached between the front 24 and back 26 portions of the casing 22, see generally FIGS. 3A and 3B. The release latch 52 is a singular, solid, plastic molded piece incorporating front and back locking clasps 54, a bottom cap portion 56 and a pull-down device 58. The front and back locking clasps 54 fit securely into the hollow casing's notches 33 when the tape dispenser 20 is closed. Additionally, the bottom cap portion 56 serves to push the tape roll holder 36 into position for tape dispensing and also serves to partially seal the hollow casing open bottom 32 when the tape dispenser 20 is closed. When the tape dispenser 20 is opened the locking clasps 54 as well as the bottom cap portion 56 are pulled away from the casing 22. In so pulling, the pull-down device 58 located in the tape roll holder recess 60 is engaged; it grips the tape roll holder 36 and lowers it from the hollow casing 22.

Additional features that may be added to the tape dispenser casing 22 include making the casing 22 or all parts of the tape dispenser 20 of clear plastic so that operation of the tape dispenser 20 may be observed. Alternatively, a viewing window 62 may be added to a solid color casing 22 so that the depletion of the highlighting tape 10 may be observed in order to determine when to reload. A finger grip 64 may also be added to the configuration of the casing 22 to help in handling the dispenser 20.

To employ the highlighting tape 10 one must first load the tape dispenser 20 with a roll configuration of the highlighting tape 10. To load the dispenser 20 one need only pull down on the front and back locking clasps 54. This will cause the pull-down device 58 to engage thereby lowering the tape roll holder 36 from the hollow casing 22. At this point, the roll of highlighting tape 10 can be inserted into the tape roll holder central cavity 44 and onto the spinning hub 46, making sure to align the highlighting tape core teeth 18 with the hub teeth 48. Before closing the dispenser 20, a small length of the highlighting tape 10 should be extended from the roll so that it may be wrapped up and around the guide lip 34 to help ease the start of tape dispensing.

To close the now loaded tape dispenser 20, one need only push the front and back locking clasps 54 into the notches 33 on the casing 22. This will force the tape roll holder 36 into its dispensing position within the casing 22. The small length of highlighting tape 10 that was previously extended may now be wrapped up and around the guide lip 34. Then, to apply the highlighting tape 10 to a line of text, see FIG. 4, one need only press the wrapped guide lip 34 to the document and pull the dispenser 20 back. At all times the dispenser 20 and guide lip 34 should be tilted so as to apply pressure to the dispensing highlighting tape 10 and document. Applying such pressure will not only help to guide placement of the highlighting tape 10 but will also help the tape 10 to adhere to the page. To stop the dispensing of the highlighting tape 10 the dispenser 20 is angled to engage the cutting edge 35 of the guide lip 34. To begin highlighting anew, the same process is repeated.

The highlighting tape 10 can easily be peeled up from the document without damaging the document type or paper. The highlighting tape 10 may also be relocated by hand to highlight new text or thrown away.

The present invention may be embodied in other specific forms without departing from the spirit of the essential attributes thereof; therefore, the illustrated embodiment should be considered in all respects as illustrative and not restrictive, reference being made to the appended claims rather than to the foregoing description to indicate the scope of the invention.

What is claimed:

1. A highlighting tape with tape dispenser comprising:
   (a) a very thin, color-fast, translucent film; and
   (b) a very thin, uniform layer of translucent, pressure sensitive adhesive covering one side of said film, the adhesive allowing the film to be applied to a printed surface, removed and reapplied to a printed surface without leaving behind an adhesive residue, the film and adhesive in roll configuration, wound about a center core, wherein the core has a plurality of protruding teeth; and
   (c) a tape dispensing means comprising:
      (i) a hand-held sized, rigid, plastic trapezoidal-shaped hollow casing comprising a solid front portion, a solid back portion, two solid side portions serving to connect the front and back portions, a solid top portion serving to connect the front, back and side portions and an open bottom, the casing narrowing in width from the open bottom to the top portion, one of the side portions having an extending guide lip, the guide lip serving to both guide and cut the dispensed highlighting tape;
      (ii) a rigid, plastic, molded, trapezoidal-shaped tape roll holder comprising a front side, a back side and a bottom portion, wherein the front side of the tape roll holder has a centrally located cavity wherein is located a spinning, toothed hub, the hub and cavity serving to hold the highlighting tape in its roll configuration, the protruding teeth of the center core meshing with the hub teeth, the tape roll holder hingedly attached between the front and back portions of the hollow casing, the back side and bottom portion of the tape roll holder containing a recess to allow for placement of the pull-down device; and (iii) a rigid, plastic, molded tape roll holder release latch comprising a front and a back locking clasp, a bottom cap portion and a pull-down device, the release latch hingedly attached between the front and back portions of the hollow casing, the pull-down device inserted into the tape roll holder recess, the front and back locking clasps capable of locking on to the front and back portions of the hollow casing respectively, the bottom cap portion serving to virtually seal the open bottom portion of the hollow casing leaving a small tape dispensing opening remaining when the locking clasps are in their locked position, the pull-down device causing the tape roll holder to swing out the open bottom portion of the hollow casing without interference for reloading of the highlighting tape when the locking clasps are in their unlocked position.

2. The highlighting tape with tape dispenser of claim 1, wherein the highlighting tape film is a fluorescent color.

3. The highlighting tape with tape dispenser of claim 1, wherein the highlighting tape is capable of tearing with a minimum of difficulty and is easily cuttable.

4. The highlighting tape with tape dispenser of claim 1, wherein the hollow casing of the tape dispensing device has a window for observing the highlighting tape in roll configuration.

* * * * *